US012762930B2

(12) United States Patent
Charest et al.

(10) Patent No.: US 12,762,930 B2
(45) Date of Patent: Oct. 13, 2026

(54) LOTTERY GAMING SYSTEM, METHODS OF OPERATING LOTTERY GAMING SYSTEMS, AND LOTTERY TICKETS

(71) Applicant: Brightstar Global Solutions Corporation, Providence, RI (US)

(72) Inventors: Joseph Charest, Attleboro, MA (US); Sarah Walker, Warwick, RI (US)

(73) Assignee: Brightstar Global Solutions Corporation, Providence, RI (US)

( * ) Notice: Subject to any disclaimer, the term of this patent is extended or adjusted under 35 U.S.C. 154(b) by 297 days.

(21) Appl. No.: 18/349,377

(22) Filed: Jul. 10, 2023

(65) Prior Publication Data

US 2025/0022348 A1 Jan. 16, 2025

(51) Int. Cl.
*G07F 17/32* (2006.01)

(52) U.S. Cl.
CPC ........ *G07F 17/329* (2013.01); *G07F 17/3244* (2013.01)

(58) Field of Classification Search
CPC ........................... G07F 17/3244; G07F 17/329
See application file for complete search history.

(56) References Cited

U.S. PATENT DOCUMENTS 5,116,049 A 5/1992 Sludikoff et al.
6,773,345 B2 8/2004 Walker et al.
7,740,243 B1 6/2010 Kean
8,272,936 B2 9/2012 Walker et al.
8,348,743 B2 1/2013 Walker et al.
10,713,900 B2 7/2020 Heathcote et al.
10,896,582 B2 1/2021 Heathcote et al.
11,682,268 B2 6/2023 Heathcote et al.
2003/0114210 A1* 6/2003 Meyer ........................ A63F 3/06 463/17
2005/0075158 A1* 4/2005 Walker .................... G07F 17/32 463/16
2005/0107153 A1* 5/2005 Jubinville ............... G07F 17/32 463/18
2006/0247008 A1* 11/2006 Walker .................... G07F 17/32 463/20
2007/0191086 A1* 8/2007 Huang .................. A63F 3/0605 463/17
2010/0185523 A1 7/2010 Tulley et al.
2011/0201401 A1 8/2011 Kumbhat et al.
2013/0337883 A1 12/2013 Stanek et al.

OTHER PUBLICATIONS

North Carolina Education Lottery Policies and Procedures Manual, Chapter 2—Game Rules, 2.04J—Sum It Up™, Feb. 24, 2013.
Win Sum Cash, Wisconsin Lottery Ticket, available before the priority date of this patent application, Jul. 10, 2023.

* cited by examiner

*Primary Examiner* — Robert E Mosser
(74) *Attorney, Agent, or Firm* — Neal, Gerber & Eisenberg LLP

(57) ABSTRACT

A lottery gaming system and method providing a play of a multi-draw lottery game, that includes a selection of a player multi-draw symbol that is for a series of drawings of a draw lottery game, and a determination of any awards based on a determination of how many occurrences of the player multi-draw symbol appear in the plurality of drawn symbols for the plurality of drawings of the draw lottery game that are used for the multi-draw lottery game.

22 Claims, 7 Drawing Sheets

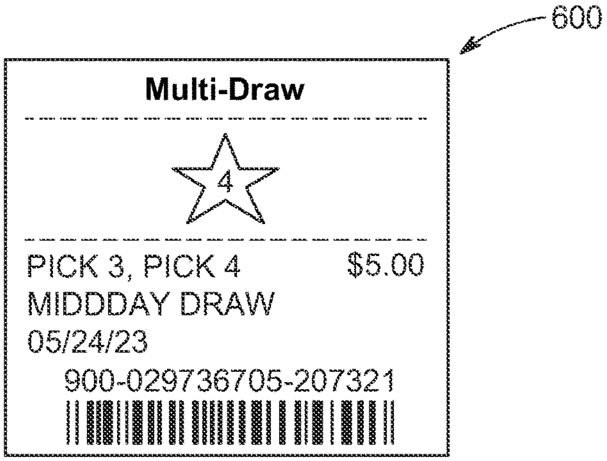
FIG. 5A
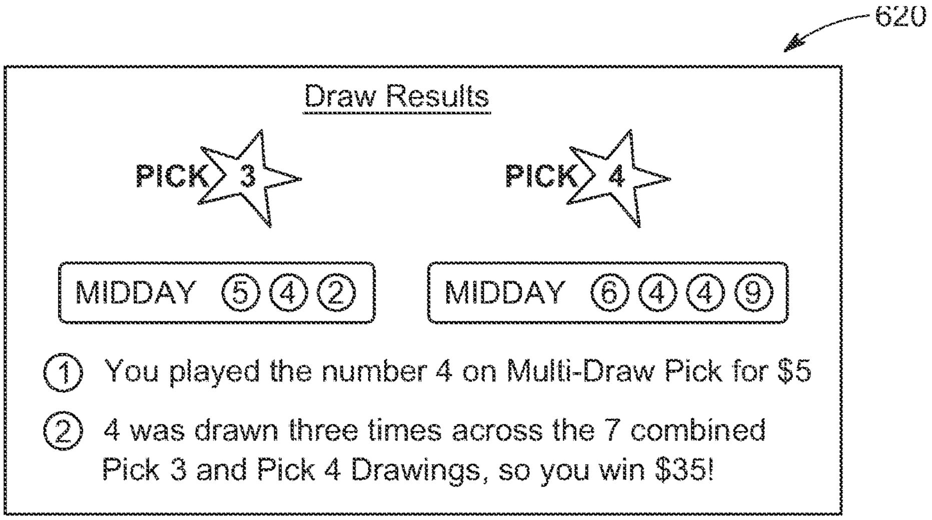
FIG. 5B
650
| Your Number is Drawn: | Odds | $1 Prizes | $2 Prizes | $5 Prizes | $10 Prizes |
|---|---|---|---|---|---|
| 7 Times | 1 in 10M | $50,000 | $125,000 | $450,000 | $1M |
| 6 Times | 1 in 150,730 | $450 | $1,000 | $3,000 | $7,500 |
| 5 Times | 1 in 5,879 | $20 | $40 | $100 | $200 |
| 4 Times | 1 in 392 | $10 | $22 | $60 | $130 |
| 3 Times | 1 in 44 | $5 | $12 | $35 | $80 |
| 2 Times | 1 in 8 | $3 | $6 | $15 | $30 |
| OVERALL ODDS | 6.7 | | | | |
FIG. 5C

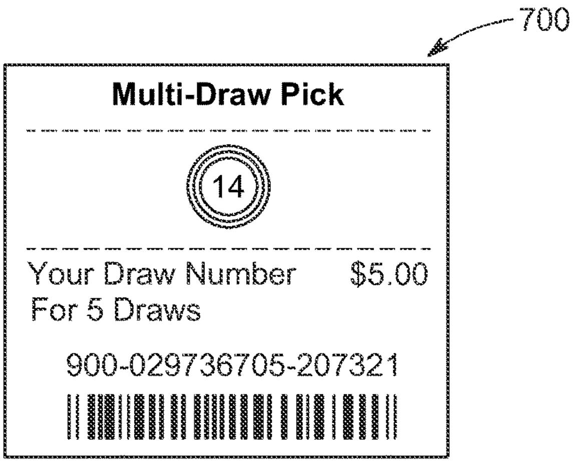
FIG. 6A
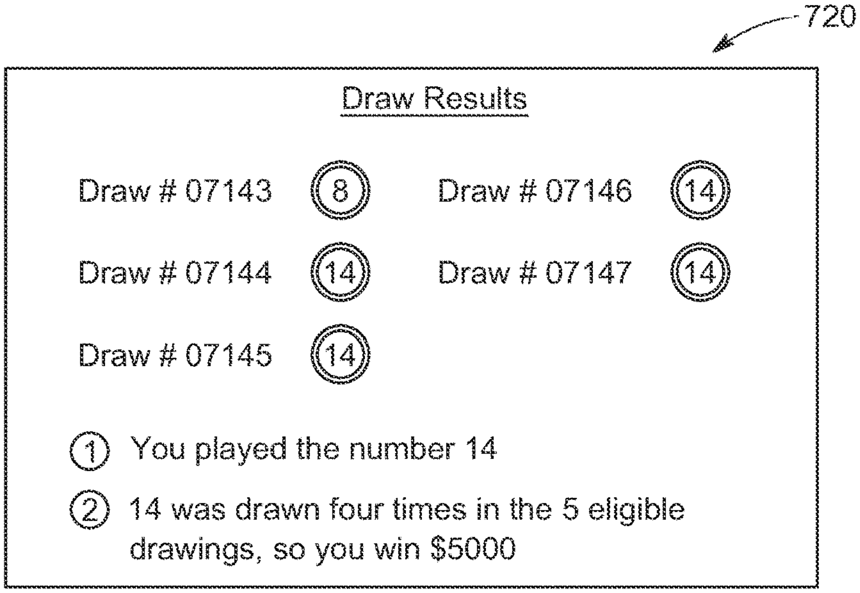
FIG. 6B
750
| Your Number is Drawn: | Odds | Prize |
|---|---|---|
| 5 Times | 1 in 759,375 | $50,000 |
| 4 Times | 1 in 10,848 | $5,000 |
| 3 Times | 1 in 387 | $500 |
| 2 Times | 1 in 28 | $50 |
| OVERALL ODDS | 25.8 | |
FIG. 6C

LOTTERY GAMING SYSTEM, METHODS OF OPERATING LOTTERY GAMING SYSTEMS, AND LOTTERY TICKETS

CROSS-REFERENCE TO RELATED APPLICATIONS

This application is related to the following commonly owned co-pending patent application: U.S. application Ser. No. 18/349,385, entitled "LOTTERY GAMING SYSTEM, METHODS OF OPERATING LOTTERY GAMING SYSTEMS, AND LOTTERY TICKETS".

BACKGROUND

The present disclosure relates to lottery gaming systems, methods of operating lottery gaming systems, and lottery tickets for plays of lottery games.

Lottery gaming systems may enable a player to select one or more numbers for a lottery ticket, randomly select winning drawn lottery numbers, and if the winning drawn lottery numbers match the player-selected numbers, provide the player an award associated with the player-selected numbers.

BRIEF SUMMARY

In various embodiments, the present disclosure relates to a method of operating a lottery gaming system including a processor, wherein the method includes: determining, via the processor, a player multi-draw symbol for a play of a multi-draw lottery game, the player multi-draw symbol including one of a plurality of different symbols that are selectable for each drawing of a draw lottery game that is used for the multi-draw lottery game; generating, via the processor, a lottery ticket including an indication of the player symbol; storing data associated with the lottery ticket; causing the lottery ticket to be provided to a player, the lottery ticket including a player multi-draw symbol portion including an indication of the player multi-draw symbol for the play of the multi-draw lottery game; for each of a plurality of independent and separate drawings of the draw lottery game that are used for the play of the multi-draw lottery game, determining a quantity of drawn symbols for that drawing of the draw lottery game from the plurality of different symbols, the quantity of drawn symbols being at least one; determining an award for the lottery ticket based on the player multi-draw symbol and a total quantity of occurrences of the player multi-draw symbol in all of the drawn symbols for all of the plurality of drawings of the draw lottery game that is used for the multi-draw lottery game; and causing a display, by a display device remote from the processor, of an indication of the award.

In various other embodiments, the present disclosure relates to a method of operating a lottery gaming system, wherein the method includes: determining, via the processor, a player multi-draw symbol for a play of a multi-draw lottery game, the player multi-draw symbol including one of a plurality of different symbols that are selectable for each drawing of a first draw lottery game and each drawing of a different second draw lottery game that are used for the multi-draw lottery game; generating, via the processor, a lottery ticket including an indication of the player multi-draw symbol; storing data associated with the lottery ticket; causing the lottery ticket to be provided to a player, the lottery ticket including a player multi-draw symbol portion including an indication of the player multi-draw symbol for the play of the multi-draw lottery game; for each of independent and separate drawings of the first draw lottery game and the second draw lottery game that are used for the play of the multi-draw lottery game, determining a quantity of drawn symbols for that drawing of the draw lottery game; determining an award for the lottery ticket based on the player multi-draw symbol and a total quantity of occurrences of the player multi-draw symbol in all of the drawn symbols for all of the plurality of drawings of the first draw lottery game and the second draw lottery game that are used for the multi-draw lottery game; and causing a display, by a display device remote from the processor, of an indication of the award.

In various other embodiments, the present disclosure relates to a method of operating a lottery gaming system including a processor, wherein the method includes: determining, via the processor, a player symbol set for one or a plurality of drawings of a draw lottery game, the player symbol set including a plurality of symbols that are selectable from a plurality of different symbols for each said drawing of the draw lottery game; determining a player multi-draw symbol for a play of a multi-draw lottery game, the player multi-draw symbol including one of the plurality of different symbols that are selectable for each drawing of the draw lottery game; generating a lottery ticket including a first indication of the player symbol set symbol and a second indication of the player multi-draw symbol; storing data associated with the lottery ticket; causing the lottery ticket to be provided to a player, the lottery ticket including a player symbol set portion including an indication of each of the symbols of the player symbol set for the drawing of the draw lottery game, the lottery ticket also including a player multi-draw symbol portion including an indication of the player multi-draw symbol for the play of the multi-draw lottery game; for each of a plurality of independent and separate drawings of the draw lottery game that are used for the play of the multi-draw lottery game, determining a quantity of drawn symbols for that drawing of the draw lottery game from the plurality of different symbols, the quantity of drawn symbols being more than one; determining a first award for the lottery ticket based on the player symbol set and the drawn symbols in one of the drawings of the draw lottery game; determining a second award for the lottery ticket based on the player multi-draw symbol and a total quantity of occurrences of the player multi-draw symbol in all of the drawn symbols for all of the plurality of drawings of the draw lottery game that are used for the play of the multi-draw lottery game; and causing a display, by a display device remote from the processor, of an indication of the first award and the second award.

Additional features are described in, and will be apparent from, the following Detailed Description and the figures.

BRIEF DESCRIPTION OF THE SEVERAL VIEWS OF THE DRAWINGS

FIG. 5A is a front view of lottery ticket for a play of a multi-draw lottery game provided by a lottery system of another example embodiment of the present disclosure.

FIG. 5B is a chart showing the results of the play of the multi-draw lottery game for the lottery ticket of FIG. 5A.

FIG. 5C is an example paytable for the play of the multi-draw lottery game for the lottery ticket of FIG. 5A.

FIG. 6A is a front view of a lottery ticket for a play of a multi-draw lottery game provided by a lottery system of another example embodiment of the present disclosure.

FIG. 6B is a chart showing the results of the play of the multi-draw lottery game for the lottery ticket of FIG. 6A.

FIG. 6C is an example paytable for the play of the multi-draw lottery game for the lottery ticket of FIG. 6A.

DETAILED DESCRIPTION

In various embodiments, the present disclosure relates to lottery gaming systems and methods of operating lottery gaming systems that provide plays of a multi-draw lottery game. In various embodiments, for the play of the multi-draw lottery game, the lottery gaming system and method provide a selection of a player multi-draw symbol (such as a player multi-draw number) that is for a series of drawings of a draw lottery game (such as a sequential series of drawings of the draw lottery game), and a determination of any awards based on a determination of how many occurrences of the player multi-draw symbol appear in the plurality of drawn symbols for the plurality of drawings of the draw lottery game that are used for the multi-draw lottery game.

In various embodiments, the lottery gaming system and method enable a player to purchase a lottery ticket for the play of the multi-draw lottery game without purchasing any plays of the underlying draw lottery game that are used for the multi-draw lottery game.

In various embodiments, the lottery gaming system and method enable a player to purchase a lottery ticket for the one or more plays of the underlying draw lottery game without a play of the multi-draw lottery game.

In various embodiments, the lottery gaming system and method enable a player to purchase a lottery ticket including a play of the multi-draw lottery game only if the player also purchases at least one play of the underlying draw lottery game that is used for the multi-draw lottery game.

In various embodiments, the lottery gaming system and method enable a player to purchase a lottery ticket including a play of the draw lottery game only if the player also purchases a play of the multi-draw lottery game.

In various embodiments, the multi-draw lottery game includes multiple drawings of the draw lottery game.

In various embodiments, the multi-draw lottery game includes multiple sequential drawings of the draw lottery game.

In various embodiments, the multi-draw lottery game include multiple drawings of different draw lottery games.

In various embodiments, the draw lottery game includes a plurality of different symbols, and the multi-draw lottery game includes the same plurality of different symbols.

In various embodiments, the draw lottery game includes a first plurality of different symbols, and the multi-draw lottery game includes a different second plurality of different symbols.

In various embodiments, the symbols for the drawings of the draw lottery game the multi-draw lottery game are numbers. In the example embodiments described herein, the symbols are numbers, but it should be appreciated that such example embodiments are not meant to limit the present disclosure.

1st Example Embodiment

Figure 1:
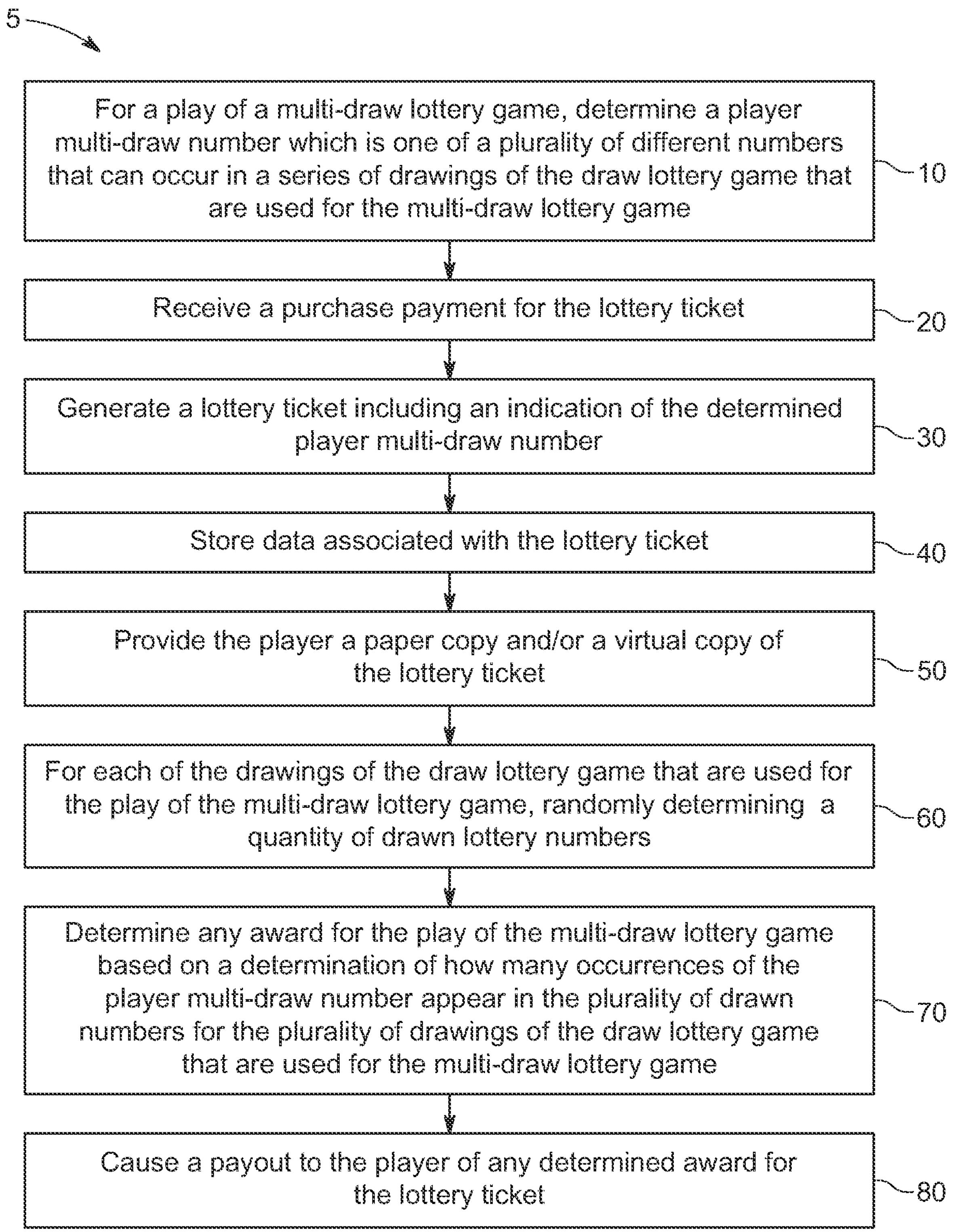
FIG. 1 is a flow chart of a method for operating a lottery gaming system of one example embodiment of the present disclosure.

FIG. 1 is a flowchart of an alternative example method (indicated by numeral 5A) of operating an example lottery gaming system of the present disclosure. In various embodiments, the method 5A is represented by a set of instructions stored in one or more memory devices and executed by one or more processors. Although the method 5A is described with reference to the flowchart shown in FIG. 4, other processes of performing the acts associated with this illustrated example method can be employed. For example, the order of certain of the illustrated blocks and/or diamonds may be changed, certain of the illustrated blocks and/or diamonds may be optional, or certain of the illustrated blocks and/or diamonds may not be employed.

Figure 4:
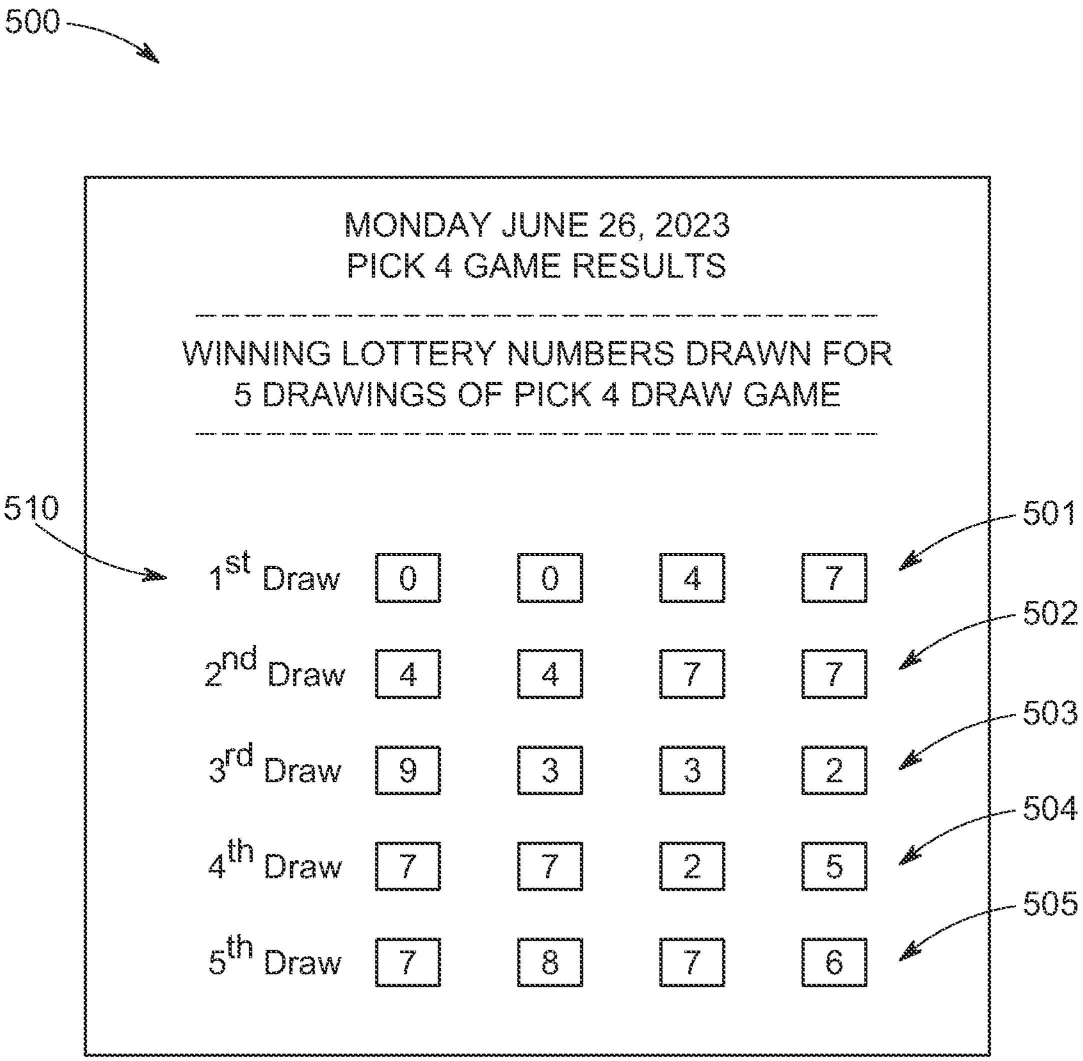
FIG. 4 is a screenshot of a display of sets of drawn lottery numbers for drawings of a draw lottery game of one example embodiment of the present disclosure.

In the example embodiment illustrated in FIG. 4, the method 5 includes the lottery gaming system: (1) for a play of a multi-draw lottery game, determining a player multi-draw number that is one of the plurality of different numbers that can occur in a series of drawings of a draw lottery game that are used for the multi-draw lottery game, as indicated by block 10; (2) receiving a purchase payment (that functions as a wager) for the lottery ticket from the player, as indicated by block 20; (3) generating a lottery ticket including an indication of the determined player multi-draw number, as indicated by block 30; (4) storing data associated with the lottery ticket, as indicated by block 40; (5) providing the player a paper copy and/or a virtual copy of the lottery ticket, as indicated by block 50; (6) for each of the drawings of the draw lottery game that are used for the multi-draw lottery game, randomly determining a quantity of drawn lottery numbers, as indicated by block 60; (7) determining any award for the play of the multi-draw lottery game based on a determination of how many occurrences of the player multi-draw number appear in the plurality of drawn numbers for the plurality of drawings of the draw lottery game that are used for the multi-draw lottery game, as indicated by block 80; and (8) causing a payout to the player of any determined award for the lottery ticket, as indicated by block 80.

In various embodiments, the determined player multi-draw number for the play of the multi-draw lottery game is selected by the player. In various embodiments, the determined player multi-draw number for the play of the multi-draw lottery game is randomly selected by the lottery system. In various embodiments, the determined player multi-draw number for the play of the multi-draw lottery game is randomly selected by the lottery system at the request of the player (such as via a quick pick).

In various example embodiments, the lottery gaming system determines any award for the play of the multi-draw lottery game based on the quantity of occurrences of the player multi-draw number in all of the drawn lottery numbers for all of the plays of the draw lottery game that are used for the multi-draw lottery game. In various embodiments, the lottery gaming system can determine and provide an award for the multi-draw lottery game based a minimum quantity of occurrences of the player number in all of the drawn lottery numbers for all of the plays of the draw lottery game that are used for the multi-draw lottery game.

It should be appreciated that the award(s) associated with the play of the multi-draw lottery game can be any suitable awards. These awards can be static, in static ranges, in changeable ranges, or otherwise changeable. In various embodiments, the changeable awards can be progressive awards, pari-mutuel awards, or other suitable changeable awards. In various embodiments, the awards can be static or changeable based on the wager level of the player, or otherwise.

It should be appreciated that while in the example embodiments described herein the determined player multi-draw number is a single number for the play of the multi-draw lottery game, in alternative embodiments, the play of the multi-draw lottery game can include multiple player multi-draw numbers.

It should be appreciated that the drawing for the draw lottery games that are used for the multi-draw lottery game can be any suitable draw lottery games.

In one example embodiment of the present disclosure, the draw lottery games is a pick 4 draw lottery game, and the multi-draw lottery game includes five sequential drawing of that pick 4 draw lottery game.

In this example embodiment, each drawing for the pick 4 lottery game includes four random selections of the numbers 0 through 9 (inclusive of 0 and 9). For example, the drawing can result in random selections of: 5 8 9 2; 3 4 4 7; or 9 9 9 9. The drawing can thus result in any set of numbers from 0 0 0 0 to 9 9 9 9.

In this example embodiment, the lottery gaming system is configured to receive a single player selection of one of the numbers 0 through 9 (inclusive of 0 and 9) for the multi-draw lottery game. For example, the player can pick the player multi-draw number to be 2 or 6.

In this example embodiment, the lottery gaming system is configured to enable the player to use a paper or virtual playslip to select: (1) the play of the multi-draw lottery game; (2) the player multi-draw number for the play of the multi-draw lottery game; and (3) the wager level (e.g., a wager amount on the play of the multi-draw lottery game), and thus to purchase the lottery ticket. In various other embodiments, the player can also wager on any of the drawings of the draw lottery game that are used for play of the multi-draw lottery game via the same playslip or a separate playslip.

Figure 2:
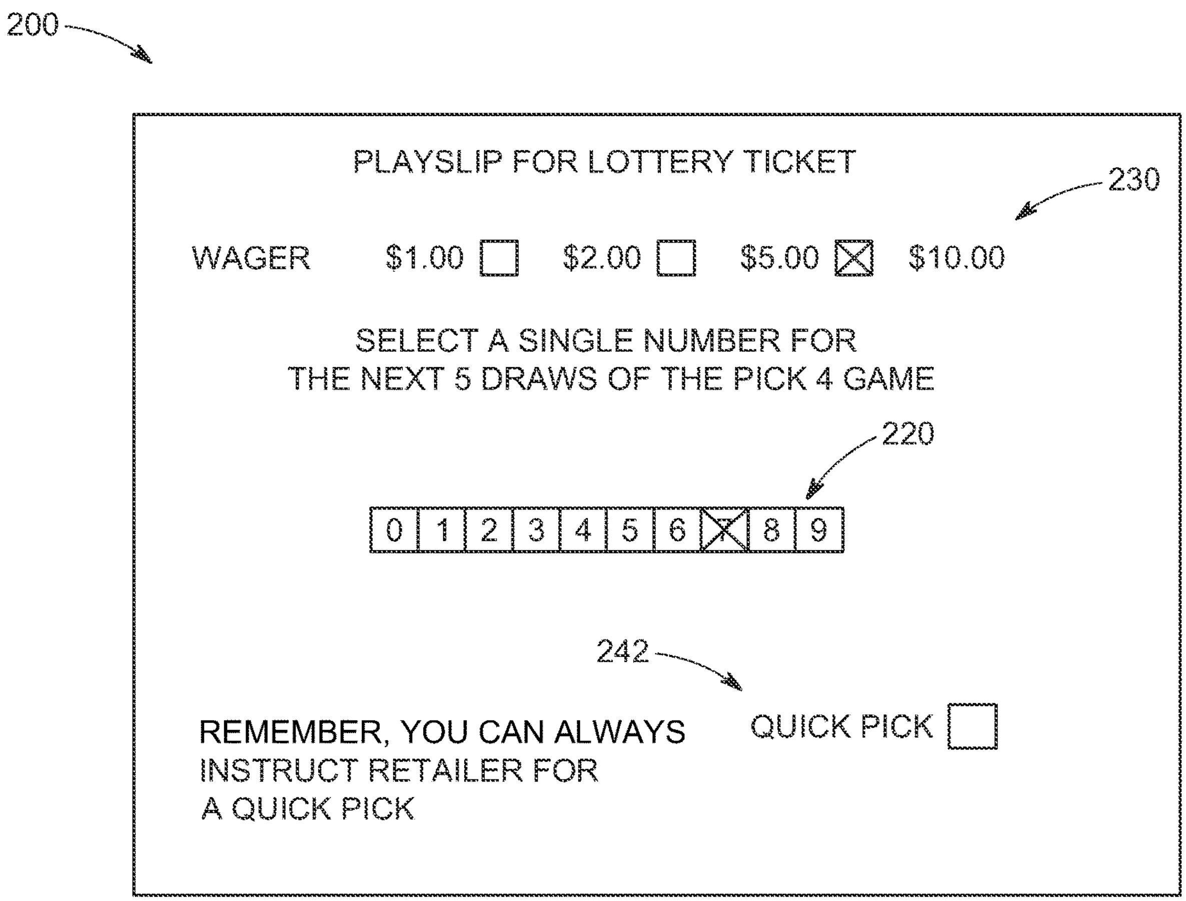
FIG. 2 is a front view of a lottery play slip of one example embodiment of the present disclosure.

In the example illustrated embodiment shown in FIG. 2, the lottery gaming system is configured to enable the player to use a single paper or virtual playslip to select the player multi-draw number, the wager, and to purchase the lottery ticket. FIG. 2 illustrates an example playslip 200. This playslip 200 includes: (1) a player multi-draw number selection portion 220; (2) a wager indication portion 230; and (3) a quick pick instruction portion 242. That is, instead of the player using the selection portion 220 for the selection of the player multi-draw number, the player may request the lottery system to randomly select the player multi-draw number. It should be appreciated that other embodiments of the playslip can include additional or alternative portions and player options and can be arranged in any suitable manner in accordance with the present disclosure.

In this example illustrated embodiment shown in FIG. 2, the player multi-draw number selection portion 220 of the playslip 200 includes a single set of different player-selectable numbers from which the player can select one number, and particularly a separate individual selectable area for each of the numbers 0 through 9 (inclusive of 0 and 9) for the player number. It should be appreciated that while the player multi-draw number selection portion 220 includes 10 different player-selectable numbers, any suitable arrangement of numbers (or other symbols) can be employed depending on the multi-draw lottery game.

As shown in FIG. 2, in this example illustrated embodiment, the player has selected the number "7" on this playslip 200 to wager on for multi-draw lottery game. This player-selected number area is indicated on the draw selection portion 220 by an X indicator 222 associated with the number 7. It should be appreciated that the player-selected number may be marked or otherwise indicated in any other suitable manner.

In this example embodiment of FIG. 2, the wager indication portion 230 of the playslip 200 includes a wager entry portion that the player may utilize for selecting a wager on the play of the multi-play lottery game. For example, the player may indicate a wager level of $1, $2, $5, $10, or other such suitable wager on the play of the multi-draw lottery game. In other embodiments, the amount of the wager on the play of the multi-draw lottery game is static (such as $1). As shown in FIG. 2, in this example illustrated embodiment, the player has selected the $5.00 wager for play of the multi-draw lottery game.

In this example embodiment of FIG. 2, the quick pick instruction portion 242 of the playslip 200 includes a message "REMEMBER, YOU CAN ALWAYS INSTRUCT RETAILER FOR A QUICK PICK," that reminds the player they can have the lottery gaming system randomly select the number for the play of the multi-play draw lottery game. In this example embodiment, the player has selected the number in the number selection portion 220 of the playslip 200. As such, the player selects their own numbers for the play of the multi-draw lottery game.

After making all of the needed player selections on the playslip 200, the lottery gaming system enables the player to purchase a lottery ticket through the lottery gaming system. In various embodiments of the lottery gaming system, the playslip is paper and the player may purchase the lottery ticket via the paper playslip. In various other embodiments of the lottery gaming system, the playslip is virtual and the player may purchase the lottery ticket via the virtual playslip. In various other embodiments, the lottery gaming system is configured to accommodate both paper and virtual playslips.

In various embodiments of the lottery gaming system, the player may purchase the lottery ticket via any suitable manner such as, but not limited to, one of the following: (1) a dedicated lottery kiosk (e.g., a lottery kiosk) configured to communicate over a data network (such as the Internet) to a lottery server (such as a lottery server 606 described below in connection with FIG. 7); (2) a retailer-operated lottery terminal configured to communicate over a data network (such as the Internet) to a lottery server (such as a lottery server 606 described below in connection with FIG. 7); (3) a personal computer configured to communicate over a data network (such as the Internet) to a lottery server (such as a lottery server 606 described below in connection with FIG. 7); and/or (4) a personal mobile device (such as a cellular telephone, tablet, a smart phone, or PDA) configured to communicate over a data network (such as a wireless or cellular data network) to a lottery server (such as a lottery server 606 described below in connection with FIG. 7).

In one such example embodiment, the lottery gaming system enables a player to use a paper playslip to purchase a lottery ticket at a retail location having a lottery terminal configured to receive the playslip and print the lottery ticket at the time of purchase in a conventional manner. In such lottery gaming systems, the retail operator can receive the purchase price for the lottery ticket from the player in a conventional manner.

In another such example embodiment, the lottery gaming system enables a player to use a virtual playslip to purchase a lottery ticket through a retail lottery kiosk configured to display the playslip (as further described below), receive the player number selections using the displayed playslip (as further described below), receive the wager from the player, and print the lottery ticket at the time of purchase. This example lottery kiosk may include an integral printer device and/or be in communication with a printer device for providing a printed lottery ticket to the player.

In another such example embodiment, the lottery gaming system enables a player to use a virtual playslip to purchase a lottery ticket electronically using a personal mobile device such as the player's mobile telephone. In one such embodiment, the lottery gaming system receives from this device the player number selections and the wager from the player, and sends the player a virtual lottery ticket (which in certain instances can be printed by the player using a suitable personal printing device). Thus, it should be appreciated that in various example embodiments, the player may purchase a lottery ticket with a personal mobile device and, thus, may not be provided with a physical (i.e., paper) lottery ticket. Instead, an electronic (or virtual) version of the lottery ticket is provided to the player via, for example, an electronic mail to an email account associated with the player.

Figure 3:
FIG. 3 is front view of a lottery ticket of one example embodiment of the present disclosure.

FIG. 3 illustrates an example lottery ticket 400 that can be issued to a player based on the player multi-draw number for the play of the multi-draw lottery game and the respective wager amount. In this example embodiment, the lottery ticket 400 includes a selected player multi-draw number portion 420, a wager portion 430, and indications of the drawings of the lottery draw lottery games for the play of the multi-draw lottery game. It should be appreciated that in various embodiments, the lottery ticket may display or include additional or alternative information, such as a player identifier, a serial number, the draw number identifiers for the drawings that are used for the play of the multi-draw game, and/or any other relevant information. It should also be appreciated that the lottery ticket provided by the lottery gaming system of the present disclosure may be alternatively configured.

In this example illustrated embodiment, the selected player multi-draw number portion 420 of the lottery ticket 400 indicates the player multi-draw number for the multi-draw lottery game. In this example embodiment, the player multi-draw number is 7.

In this example embodiment, for each lottery ticket purchased, the lottery gaming system creates a data record corresponding to that lottery ticket. For example, when a lottery terminal is used to purchase a lottery ticket, the lottery gaming system creates a data record including suitable information such as but not limited to: (1) a timestamp (date and/or time) associated with when the lottery ticket was purchased; (2) the player multi-draw number; (3) the player-selected wager amount for the play of the multi-draw lottery game; (4) the lottery ticket identification number; and (5) any other suitable information.

In various example embodiments, this data record is created by the lottery terminal and sent by the lottery terminal to the lottery server (such as described below in connection with the lottery server 606 of FIG. 7). It should be appreciated that the lottery ticket data record can be otherwise suitably created in accordance with the present disclosure.

FIG. 4 illustrates a display device 500 displaying example sets of drawn lottery numbers 501, 502, 503, 504, and 505 that are drawn for the pick 4 draw lottery games that are also used for the multi-draw lottery game. This display includes a drawn numbers portion 510 that displays the drawn lottery numbers for five drawings of the draw lottery game that are used for the multi-draw lottery game.

In this example illustrated embodiment, the lottery gaming system randomly selected the numbers 0 0 4 7, 4 4 7 7, 9 3 3 2, 7 7 2 5, and 7 8 7 6 as the drawn lottery numbers for the 5 drawings of the pick 4 draw lottery game that are used for the multi-draw lottery game.

In this example embodiment, after the lottery gaming system randomly selects the sets of drawn lottery numbers, the lottery gaming system can determine if any purchased lottery tickets are winning lottery tickets.

The lottery gaming system determines the quantity of occurrences of the player multi-draw number in all of the drawn number from the drawings of the draw lottery game that are used for the multi-draw lottery game for this example illustrated lottery ticket 400. In this example, the lottery gaming system determines an award of $1000 based on the seven occurrences of player multi-draw number 7 in all five of the drawings of the draw lottery game that are used for the multi-draw lottery game.

When this lottery ticket 400 is redeemed, the lottery gaming system causes the award of $1000 to be provided to the holder of the lottery ticket 400.

In this example embodiment, the draw lottery games that are used for the multi-draw lottery game are each a pick 4 draw lottery game. It should be appreciated that the draw lottery games can be any suitable draw lottery game such as but not limited to: (1) a pick 1 draw lottery game; (2) a pick 2 draw lottery game; (3) a pick 3 draw lottery game; (4) a pick 5 draw lottery game; or (5) a pick 6 draw lottery game.

In other example embodiments, the draw lottery games that are used for the multi-draw lottery game games can be two or more different 4 draw lottery games.

2nd Example Embodiment

In a second example embodiment of the present disclosure, the multi-draw lottery game includes a drawing for a pick 3 draw lottery game and a drawing for a pick 4 draw lottery game.

FIG. 5A shows an example lottery ticket 600 for the multi-draw lottery game where the player multi-draw number is 4, the player wager is $5.00, and the midday PICK 3 and PICK 4 draw lottery games are the draw lottery games that are used for the multi-draw lottery game.

FIG. 5B shows a display device displaying a display 620 of the drawn lottery numbers for the midday PICK 3 and PICK 4 draw lottery games that are used for the multi-draw lottery game. In this example, the drawn lottery numbers are 5 4 2 for the PICK 3 draw lottery game and 6 4 4 9 for the PICK 4 draw lottery game. Thus, in this example three occurrences of the player multi-draw number 4 have occurred.

FIG. 5C shows the example paytable 650 for this multi-draw lottery game. In this example, since 3 occurrences of the player multi-draw number 4 have occurred, and since the player wagered $5.00, the player is awarded $35 for this lottery ticket upon redemption.

3rd Example Embodiment

In a third example embodiment of the present disclosure, the multi-draw lottery game includes five drawings for a pick 1 draw lottery game.

FIG. 6A shows an example lottery ticket 700 for the multi-draw lottery game where the player multi-draw number is 14, the player wager is $5.00, and the five pick 1 draw lottery game drawings are the draw lottery game drawings that will be used for the multi-draw lottery game.

FIG. 6B shows a display device displaying a display 720 of the drawn lottery numbers for the five pick 1 draw lottery game drawings (e.g., draw #s 07143-07147). In this example, the drawn lottery numbers are 8 for the first drawing of the draw lottery game, 14 for the second drawing of the draw lottery game, 14 for the third drawing of the draw lottery game, 14 for the fourth drawing of the draw lottery game, and 14 for the fifth drawing of the draw lottery game. Thus, in this example four occurrences of the player number 14 have occurred.

FIG. 6C shows the example paytable 750 for this multi-draw lottery game. In this example, since four occurrences of the player multi-draw number 14 have occurred, the player is awarded $5000 for this lottery ticket upon redemption.

In various other embodiments, the lottery gaming system and method enable a player to play one or more of draw lottery games that are used for the multi-draw lottery game. For example, the player can wager on the first drawing of the draw lottery game. Such a method can include the lottery gaming system: (1) for a play of a draw lottery game, determining a player symbol set of lottery numbers from a plurality of different numbers for a first play of the draw lottery game; (2) determining a player multi-draw number (which is one of the plurality of different numbers of the draw lottery game) for a series of plays of the draw lottery game that are used for the multi-draw lottery game; (3) receiving a purchase payment (that functions as a wager) for the lottery ticket from the player; (4) generating a lottery ticket including an indication of the determined player symbol set and an indication of the determined player multi-draw number; (5) storing data associated with the lottery ticket; (6) providing the player a paper copy and/or a virtual copy of the lottery ticket; (7) for the first play of the draw lottery game, randomly determining a quantity of drawn lottery numbers; (8) for the each of the additional plays of the series of plays of the draw lottery game that are used for the multi-draw lottery game, randomly determining a quantity of drawn lottery numbers for that play of the draw lottery game; (9) determining any award for the first play of the draw lottery game based on a comparison on the player symbol set and the drawn numbers for the first play of the draw lottery game; (10) determining any award for the play of the multi-draw lottery game based on a determination of how many occurrences of the player multi-draw number appear in the plurality of drawn numbers for the plurality of plays of the draw lottery game that are used for the multi-draw lottery game; and (11) causing a payout to the player of any determined awards for the lottery ticket. In various such embodiments, the numbers of the determined player symbol set for the first play of the draw lottery game are selected by the player. In various embodiments, the numbers of the determined player symbol set for the first play of the draw lottery game are randomly selected by the lottery system. In various embodiments, the numbers of the determined player symbol set for the first play of the draw lottery game are randomly selected by the lottery system at the request of the player (such as via a quick pick). In various such embodiments, the lottery gaming system determines any award for the play of the draw lottery game if the player symbol set of the lottery ticket match each of the drawn lottery numbers. That is, the lottery gaming system provides an award to a player if the player numbers match all of the drawn lottery numbers for that play of the draw lottery game. In other example embodiments, less that all of the numbers need to be matched for the play of the draw lottery game to result in an award. In various such embodiments, the award(s) associated with the play of the draw lottery game can be any suitable awards. These awards can be static, in static ranges, in changeable ranges, or otherwise changeable. In various embodiments, the changeable awards can be progressive awards, pari-mutuel awards, or other suitable changeable awards. In various embodiments, the awards can be static or changeable based on the wager level of the player, or otherwise.

It should be appreciated from the above that in various embodiments the present disclosure relates to a lottery gaming system configured to: (1) determine a player multi-draw symbol for a play of a multi-draw lottery game, the player multi-draw symbol comprising one of a plurality of different symbols that are selectable for each drawing of a draw lottery game that is used for the multi-draw lottery game; (2) generate a lottery ticket comprising the player multi-draw symbol; (3) store data associated with the lottery ticket; (4) cause the lottery ticket to be provided to a player, the lottery ticket comprising a player multi-draw symbol portion comprising an indication of the player multi-draw symbol for the play of the multi-draw lottery game; (5) for each of a plurality of independent and separate drawings of the draw lottery game that are used for the play of the multi-draw lottery game, determine a quantity of drawn symbols for that drawing of the draw lottery game from the plurality of different symbols, the quantity of drawn symbols being at least one; (6) determine an award for the lottery ticket based on the player multi-draw symbol and a total quantity of occurrences of the player multi-draw symbol in all of the drawn symbols for all of the plurality of drawings of the draw lottery game that is used for the multi-draw lottery game; and (7) cause a display, by a remote display device, of an indication of the award. In various such embodiments, the gaming system is configured to receive an indication of a wager for the play of the multi-draw lottery game. In various such embodiments, the quantity of drawn symbols for each drawing of the draw lottery game that are used for the play of the multi-draw lottery game is more than one. In various such embodiments, the quantity of drawn symbols for each drawing of the draw lottery game that are used for the play of the multi-draw lottery game is the same. In various such embodiments, the quantity of drawn symbols for each of two drawings of the draw lottery game that are used for the play of the multi-draw lottery game are different. In various such embodiments, the plurality of independent and separate drawings of the draw lottery game that are used for the play of the multi-draw lottery game are sequential drawings of the draw lottery game. In various such embodiments, the plurality of independent and separate drawings of the draw lottery game that are used for the play of the multi-draw lottery game are non-sequential drawings of the draw lottery game. In various such embodiments, the display device is part of a mobile device. In various such embodiments, the display device is part of a lottery terminal.

It should further be appreciated from the above that in various embodiments the present disclosure relates to a lottery gaming system configured to: (1) determine a player multi-draw symbol for a play of a multi-draw lottery game, the player multi-draw symbol comprising one of a plurality of different symbols that are selectable for each drawing of a first draw lottery game and each drawing of a different second draw lottery game that are used for the multi-draw lottery game; (2) generate a lottery ticket comprising the player multi-draw symbol; (3) store data associated with the lottery ticket; (4) cause the lottery ticket to be provided to a player, the lottery ticket comprising a player multi-draw symbol portion comprising an indication of the player multi-draw symbol for the play of the multi-draw lottery game; (5) for each of independent and separate drawings of the first draw lottery game and the second draw lottery game that are used for the play of the multi-draw lottery game, determine a quantity of drawn symbols for that drawing of the draw lottery game; (6) determine an award for the lottery ticket based on the player multi-draw symbol and a total quantity of occurrences of the player multi-draw symbol in all of the drawn symbols for all of the plurality of drawings of the first draw lottery game and the second draw lottery game that are used for the multi-draw lottery game; and (7) cause a display, by a display device remote from the processor, of an indication of the award. In various such embodiments, the includes receiving an indication of a wager for the play of the multi-draw lottery game. In various such embodiments, the quantity of drawn symbols for each drawing of the first draw lottery game and each drawing of the second draw lottery game that are used for the multi-draw lottery game is more than one. In various such embodiments, the quantity of drawn symbols for each drawing of the first draw lottery game is different than the quantity of drawn symbols for each drawing of the second draw lottery game. In various such embodiments, the first draw lottery game is a pick 3 draw lottery game, and the second draw lottery game is a pick 4 draw lottery game. In various such embodiments, the display device is part of a mobile device or part of a lottery terminal.

It should further be appreciated from the above that in various embodiments the present disclosure relates to a lottery gaming system configured to: (1) determine a player symbol set for one or a plurality of drawings of a draw lottery game, the player symbol set comprising a plurality of symbols that are selectable from a plurality of different symbols for each said drawing of the draw lottery game; (2) determine a player multi-draw symbol for a play of a multi-draw lottery game, the player multi-draw symbol comprising one of the plurality of different symbols that are selectable for each drawing of the draw lottery game; (3) generate a lottery ticket comprising the player symbol set symbol and the player multi-draw symbol; (4) store data associated with the lottery ticket; (5) cause the lottery ticket to be provided to a player, the lottery ticket comprising a player symbol set portion comprising an indication of each of the symbols of the player symbol set for the drawing of the draw lottery game, the lottery ticket also comprising a player multi-draw symbol portion comprising an indication of the player multi-draw symbol for the play of the multi-draw lottery game; (6) for each of a plurality of independent and separate drawings of the draw lottery game that are used for the play of the multi-draw lottery game, determine a quantity of drawn symbols for that drawing of the draw lottery game from the plurality of different symbols, the quantity of drawn symbols being more than one; (7) determine a first award for the lottery ticket based on the player symbol set and the drawn symbols in one of the drawings of the draw lottery game; (8) determine a second award for the lottery ticket based on the player multi-draw symbol and a total quantity of occurrences of the player multi-draw symbol in all of the drawn symbols for all of the plurality of drawings of the draw lottery game that are used for the play of the multi-draw lottery game; and (9) cause a display, by a display device remote from the processor, of an indication of the first award and the second award. In various such embodiments, the quantity of drawn symbols for each drawing of the draw lottery game is the same. In various such embodiments, the drawing of the draw lottery game that are used for the play of the multi-draw lottery game are sequential drawings of the draw lottery game. In various such embodiments, the draw lottery game is one of a pick 3 draw lottery game and a pick 4 draw lottery game. In various such embodiments, the display device is part of a mobile device or part of a lottery terminal.

It should also be appreciated from the above, that the present disclosure improves lottery gaming technology and current lottery tickets in part by providing a new way for players to interact with the lottery gaming system, and new ways to win awards that are based on the winning outcomes of multiple separate and individual draw lottery games. It should further be appreciated from the above that the present disclosure improves lottery gaming technology in part by providing a new way to link draw lottery games through the lottery gaming system. It should further be appreciated from the above that the present disclosure improves lottery gaming technology in part by providing a new way to provide a winning outcome for an otherwise non-winning lottery ticket for a single draw lottery game, and thus also a way to increase lottery ticket sales. It should further be appreciated from the above that the present disclosure improves lottery gaming technology in part by providing a new type of selection for a player to make for a lottery ticket, and thus also a way to increase lottery ticket sales. It should further be appreciated from the above that the present disclosure improves lottery gaming technology in part by providing new ways to provide different types of awards lottery tickets, and thus also a way to increase lottery ticket sales.

Example Lottery Gaming Systems—General

As mentioned above, in various embodiments, the lottery gaming system and method of the present disclosure are configured to be operated by a lottery agency (such as a state lottery agency).

As mentioned above, in various other embodiments, the lottery gaming system and method of the present disclosure are configured to be operated by a third party that runs the lottery for a lottery agency (such as a state lottery agency).

Figure 7:
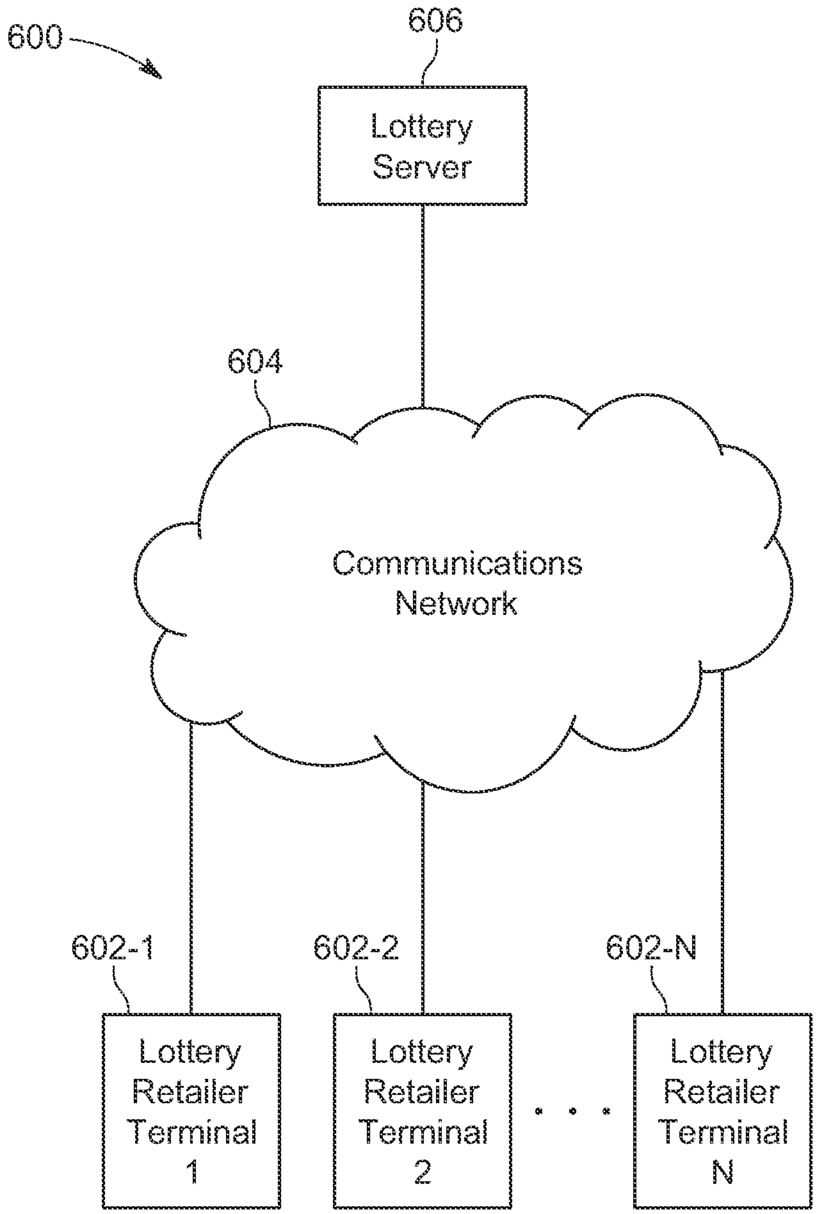
FIG. 7 is a schematic diagram of a lottery gaming system of one example embodiment of the present disclosure.

FIG. 7 illustrates an example networked lottery gaming system 600 for such implementation. This example network lottery gaming system 600 generally includes: (1) a plurality of lottery retailer terminals 602-1 to 602-N; (2) a communications network 604; and (3) one or more lottery servers such as lottery server 606. Generally, the retailer terminals 602-1 to 602-N and the lottery server 606 are configured to perform the functions described above and further described below.

In this example embodiment, each retailer terminal 602 corresponds to (or is associated with) a particular lottery retailer. For example, the first retailer terminal 602-1 of FIG. 7 may be associated with a first lottery retailer, such as a convenience store, and the second retailer terminal 602-2 of FIG. 7 may be associated with a second lottery retailer, such as a supermarket. It should be understood that any suitable quantity of lottery retailer terminals may be employed in the lottery gaming system 600, along with any suitable quantity of corresponding lottery servers 606.

In various example embodiments, the lottery retailer terminal 602 includes one or more processor(s). Generally, the processor is operative to perform or process instructions, and in particular, to operate in accordance with the various methods described herein. For example, the processor of the lottery retailer terminal 602 may be operable to enable the lottery retailer terminal 602 to transmit data to (and receive data from) the lottery server 606. More specifically, the processor may enable the transmission of data representing each lottery ticket.

In various example embodiments, the lottery retailer terminal 602 includes one or more input device(s). The input devices of the lottery retailer terminal 602 may include components such as an optical scanner and/or a barcode scanner, for reading and/or for deriving information associated with a playslip and/or a lottery ticket. For example, a lottery ticket may include registration marks, authenticity data, various codes, micro-printed indicia, one or more sense marks, and/or other lottery indicia that must be read. Examples of additional input devices include, but are not limited to, a keypad, a mouse, an image capturing device (e.g., an optical character recognition (OCR) device), a biometric reader, a portable storage device (e.g., a memory stick), and the like.

In various example embodiments, the input device(s) of the lottery retailer terminal 602 may include a clock. The clock may be employed to detect, derive and/or append time and/or date information for use by the lottery server 606 to: (i) create a data record corresponding to lottery tickets purchased at the lottery retailer terminal 602, (ii) to determine redemption time, round and/or date information associated with lottery tickets, and/or (iii) determine whether a lottery player has redeemed their lottery ticket in a manner that qualifies the player to receive a particular redemption or settlement amount.

In various example embodiments, the lottery retailer terminal 602 includes one or more output device(s). Such output device(s) may include such components as a display for outputting information to a lottery player or to a terminal operator (e.g., win/loss information and/or payout amounts), one or more benefit output devices (e.g., a cash drawer, a currency dispenser), a printer for producing a physical record (e.g., paper slip, receipt, ticket, voucher, coupon, etc.) that defines a lottery ticket, audio/video output device(s), and the like.

In various example embodiments, the lottery retailer terminal 602 also includes one or more communications port(s), such as a serial port, a modem or the like. Generally, the communications port of the lottery retailer terminal 602 may be operable to facilitate two-way data communications between (i) the lottery retailer terminal 602, and (ii) the lottery server 606. In accordance with some embodiments, the communications port of the lottery retailer terminal 602 may operate to facilitate the transmission of information between the lottery retailer terminal and a player device such as a personal digital assistant (PDA), cell phone and/or a dedicated (e.g., a proprietary) device.

In various example embodiments, the lottery retailer terminal 602 includes a data storage device such as a hard disk, optical or magnetic media, random access memory (RAM) and/or read-only memory (ROM), or the like memory device. Generally, the data storage device of the lottery retailer terminal 602 stores a software program, the software program enabling a processor of the retailer terminal 602 to perform various functions including some or all of the various steps described herein. For example, in accordance with various embodiments, the lottery retailer terminal 602 may be configured to perform some or all of the functions of the lottery server 606 (and vice versa) such that the lottery server 606 and the lottery retailer terminal 602 may be considered as the same "device."

In various example embodiments, a lottery sales device may be utilized in place of a lottery retailer terminal 602. Such a lottery sales device may be implemented as a lottery server, a controller, a dedicated hardware circuit, an appropriately programmed general-purpose computer, or any other equivalent electronic, mechanical or electro-mechanical device. Thus, in various embodiments, a lottery sales device may include, for example, but is not limited to: (1) a video lottery terminal that may include a touch sensitive screen for use by a player; (2) a personal computer (e.g., which communicates with a remote lottery server); or (3) a personal mobile device such as a mobile telephone, a tablet, or a personal digital assistant. The lottery sales device may include any or all of the devices of the aforementioned systems.

In this example embodiment, the lottery server 606 operates to: (1) receive and/or store data associated with one or more lottery tickets including such data as: (a) ticket identifier(s), and (b) ticket indicia; (2) determine at least a first redemption amount associated with a lottery ticket; (3) receive a redemption request associated with the lottery ticket; (4) determine a time of play associated with the redemption request; and (5) transmit an indication of the appropriate redemption amount to a lottery retailer terminal (e.g., for output or display to a lottery player and/or lottery terminal operator).

In various example embodiments, the lottery server 606 includes one or more processor(s). Such a processor functions to process instructions, and in particular, to operate in accordance with various methods described herein. For example, the processor may operate to enable the lottery server 606 to transmit data to (and receive data from) the lottery retailer terminal 602. More specifically, the processor of the lottery server 606 may enable the transmission of data representing a lottery ticket, as well as information defining one or more payout(s) associated with that lottery ticket to or by a specific one of the lottery retailer terminals 602 shown in the lottery network 600 of FIG. 7. Thus, the lottery server 606 may be implemented as a system controller, a dedicated hardware circuit, an appropriately and particularly programmed general-purpose computer, or any other equivalent electronic, mechanical or electro-mechanical device capable of providing for one or more of the embodiments described herein.

In various example embodiments, the lottery server 606 includes one or more input device(s). Examples of such input devices include a keypad, a mouse, a touch-screen, a random number generator, a microphone, and other digital or analog input devices.

In various example embodiments, the lottery server 606 also includes one or more output device(s). Example of output device(s) of the lottery server 606 include a monitor or other display for outputting information to an operator of the lottery server 606 (e.g., for displaying information such as statistical or sales data, win and loss information and/or payout amounts), a printer for producing a physical record (e.g., a report) of such data, and the like. In addition, the lottery server 606 may include one or more communications ports, such as a serial port, modem or the like, operable to facilitate two-way data communications between (i) the lottery server 606 and (ii) one or more lottery retailer terminals 602.

In various example embodiments, the lottery server 606 includes a data storage device (e.g., a hard disk or hard drive, a media-based (removable) memory, or the like). In certain embodiments, the data storage device of the lottery server 606 stores at least one software program, which includes a program to enable the processor of the lottery server 606 to perform some or all of the various steps and functions of at least one implementation of the methods described in detail herein. In addition, the data storage device of the lottery server 606 may operate to store one or more databases including a lottery ticket database and a lottery ticket redemption status database.

In various example embodiments, the lottery server 606 includes a lottery ticket server device that is located at a lottery ticket printing facility, and may also function to manage the ticket printing process. The lottery server 606 may also function to develop a lottery game matrix (e.g., determining base payouts, win frequencies, and the like) and to match static lottery content with secure paytable (or payout distribution) data. In certain embodiments, a lottery ticket printer device for use in such lottery gaming systems may utilize the game matrix information from the lottery server and may apply it to the secure paytable data.

In certain example embodiments, a retailer terminal (such as the first retailer terminal 602-1) of FIG. 7 is configured to perform some or all of the functions of the lottery server 606. Thus, in certain example embodiments, the lottery server 606 and the retailer terminal (such as the first retailer terminal 602-1) (or another given retailer terminal and server pairing) may be considered as the same "device."

Generally, the communications network 604 of FIG. 7 includes one or more local and/or wide-area network(s) proprietary and/or public network(s) (e.g., the Internet) for facilitating two-way data communications between the retailer terminals 602 and the lottery server 606. The lottery server 606 may communicate with lottery retailer terminals 602 directly or indirectly, via a wired or wireless medium, such as via the Internet, via a local area network (LAN), via a wide area network (WAN), via an Ethernet, via a Token Ring, via a telephone line, via a cable line, via a radio channel, via an optical communications line, via a satellite communications link, or via any other appropriate communications system or combinations thereof. Any number and type of devices may be in communication with the lottery server 606, and communication between the lottery retailer terminals 602 and the lottery server 606 may be direct or indirect. A variety of communications protocols may be part of any such communications system, including, but not limited to: Ethernet (or IEEE 802.3), SAP, ATP, Bluetooth™, and TCP/IP.

It should be understood that devices in communication with each other need not be continually transmitting to each other. On the contrary, such devices need only transmit to each other as necessary, and may actually refrain from exchanging data most of the time. For example, a device in communication with another device via the Internet may not transmit data to the other device for days or weeks at a time. In some embodiments, a server may not be necessary and/or preferred. For example, in one or more embodiments, methods described herein may be practiced on a stand-alone gaming device and/or a gaming device in communication only with one or more other gaming devices. In such an embodiment, any functions described as performed by the computer may instead be performed by one or more gaming devices.

As used herein, a lottery retailer may include a merchant who sells lottery tickets at a particular location, authenticates winning lottery tickets, redeems authenticated winning lottery tickets, and/or provides awards to players for winning lottery tickets. Examples of various lottery retailers include, but are not limited to, convenience stores, gas stations, supermarkets, and gaming establishments.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A method of operating a lottery gaming system comprising a lottery terminal comprising an optical scanner, a communications network, and a lottery server comprising a processor and a memory device that stores a plurality of instructions executable by the processor, the method comprising:

determining, via the processor, a single player multi-draw symbol for a play of a multi-draw lottery game, the single player multi-draw symbol being one of a plurality of different symbols that are randomly selectable for each sequential drawing of a draw lottery game, wherein the single player multi-draw symbol is selected by a player via the lottery gaming system prior to all of a plurality of sequential drawings of the draw lottery game that are used for the multi-draw lottery game, wherein the single multi-draw symbol is determined by optically scanning, via the optical scanner of the lottery terminal, a playslip comprising a single multi-draw symbol selection portion, a wager indication portion, and a quick pick instruction portion, and wherein the playslip is either one of a paper playslip and a virtual playslip, and wherein the single player multi-draw symbol is the only symbol that the player picks for the plurality of sequential drawings;

generating, via the processor, a lottery ticket comprising the single player multi-draw symbol;

storing data associated with the lottery ticket;

causing the lottery ticket to be provided to a player via one or both of a paper copy and a virtual copy, the lottery ticket comprising a player multi-draw symbol portion comprising an indication of the single player multi-draw symbol for the play of the multi-draw lottery game;

for each of the plurality of sequential drawings of the draw lottery game that are used for the play of the multi-draw lottery game, independently and separately randomly determining, via a random number generator, a quantity of drawn symbols for that drawing of the draw lottery game from the plurality of different symbols, the quantity of drawn symbols being at least one;

determining an award for the lottery ticket based on the single player multi-draw symbol and a total quantity of occurrences of the single player multi-draw symbol in all of the drawn symbols for all of the plurality of sequential drawings of the draw lottery game that are used for the multi-draw lottery game; and causing a display, by a display device remote from the processor, of an indication of the award.

2. The method of claim 1, which comprises receiving an indication of a wager for the play of the multi-draw lottery game.

3. The method of claim 1, wherein the quantity of drawn symbols for each drawing of the draw lottery game that are used for the play of the multi-draw lottery game is more than one.

4. The method of claim 1, wherein the quantity of drawn symbols for each drawing of the draw lottery game that are used for the play of the multi-draw lottery game is the same.

5. The method of claim 1, wherein the quantity of drawn symbols for each of two drawings of the draw lottery game that are used for the play of the multi-draw lottery game are different.

6. The method of claim 1, wherein the display device is part of a mobile device.

7. The method of claim 1, wherein the display device is part of the lottery terminal.

8. A method of operating a lottery gaming system comprising a lottery terminal comprising an optical scanner, a communications network, and a lottery server comprising a processor and a memory device that stores a plurality of instructions executable by the processor, the method comprising:

determining, via the processor, a single player multi-draw symbol for a play of a multi-draw lottery game, the single player multi-draw symbol being one of a plurality of different symbols that are randomly selectable for each drawing of a first draw lottery game and each drawing of a different second draw lottery game that are used for the multi-draw lottery game, wherein the single player multi-draw symbol is selected by a player via the lottery gaming system prior to each drawing of the first draw lottery game that is used for the multi-draw lottery game and prior to each drawing of the second draw lottery game that is used for the multi-draw lottery game, wherein the single player multi-draw symbol is determined by optically scanning, via the optical scanner of the lottery terminal, a playslip comprising a player multi-draw number selection portion, a wager indication portion, and a quick pick instruction portion, and wherein the playslip is either one of a paper playslip and a virtual playslip, and wherein the single player multi-draw symbol is the only symbol that the player picks for the plurality of drawings;

generating, via the processor, a lottery ticket comprising the single player multi-draw symbol;

storing data associated with the lottery ticket;

causing the lottery ticket to be provided to a player via one or both of a paper copy and a virtual copy, the lottery ticket comprising a player multi-draw symbol portion comprising an indication of the single player multi-draw symbol for the play of the multi-draw lottery game;

for each of independent and separate drawings of the first draw lottery game and the second draw lottery game that are used for the play of the multi-draw lottery game, independently and separately randomly determining, via a random number generator, a quantity of drawn symbols for that drawing of the draw lottery game;

determining an award for the lottery ticket based on the single player multi-draw symbol and a total quantity of occurrences of the single player multi-draw symbol in all of the drawn symbols for all of the plurality of drawings of the first draw lottery game and the second draw lottery game that are used for the multi-draw lottery game; and causing a display, by a display device remote from the processor, of an indication of the award.

9. The method of claim 8, which comprises receiving an indication of a wager for the play of the multi-draw lottery game.

10. The method of claim 8, wherein the quantity of drawn symbols for each drawing of the first draw lottery game and each drawing of the second draw lottery game that are used for the multi-draw lottery game is more than one.

11. The method of claim 8, wherein the quantity of drawn symbols for each drawing of the first draw lottery game is different than the quantity of drawn symbols for each drawing of the second draw lottery game.

12. The method of claim 8, wherein the first draw lottery game is a pick 3 draw lottery game, and the second draw lottery game is a pick 4 draw lottery game.

13. The method of claim 8, wherein the display device is part of a mobile device or part of the lottery terminal.

14. A method of operating a lottery gaming system comprising a lottery terminal comprising an optical scanner, a communications network, and a lottery server comprising a processor and a memory device that stores a plurality of instructions executable by the processor, the method comprising:

determining, via the processor, a player symbol set for one of a plurality of sequential drawings of a draw lottery game, the player symbol set comprising a plurality of symbols that are randomly selectable from a plurality of different symbols for each said sequential drawing of the draw lottery game;

determining a single player multi-draw symbol for a play of a multi-draw lottery game, the single player multi-draw symbol being one of the plurality of different symbols that are selectable for each drawing of the draw lottery game, wherein the single player multi-draw symbol is selected by a player via the lottery gaming system prior to each of the sequential drawings that are used for the multi-draw lottery game, wherein the single player multi-draw symbol is determined by optically scanning, via the optical scanner of the lottery terminal, a playslip comprising a player multi-draw number selection portion, a wager indication portion, and a quick pick instruction portion, and wherein the playslip is either one of a paper playslip and a virtual playslip, and wherein the single player multi-draw symbol is the only symbol that the player picks for the plurality of sequential drawings in addition to the player symbol set for the one of the plurality of sequential drawings;

generating a lottery ticket comprising the player symbol set symbol and the single player multi-draw symbol;

storing data associated with the lottery ticket;

causing the lottery ticket to be provided to a player via one or both of a paper copy and a virtual copy, the lottery ticket comprising a player symbol set portion comprising an indication of each of the symbols of the player symbol set for the drawing of the draw lottery game, the lottery ticket also comprising a player multi-draw symbol portion comprising an indication of the single player multi-draw symbol for the play of the multi-draw lottery game;

for each of a plurality of independent and separate sequential drawings of the draw lottery game that are used for the play of the multi-draw lottery game, randomly determining, via a random number generator, a quantity of drawn symbols for that drawing of the draw lottery game from the plurality of different symbols, the quantity of drawn symbols being more than one;

determining a first award for the lottery ticket based on the player symbol set and the drawn symbols in one of the drawings of the draw lottery game;

determining a second award for the lottery ticket based on the single player multi-draw symbol and a total quantity of occurrences of the single player multi-draw symbol in all of the drawn symbols for all of the plurality of sequential drawings of the draw lottery game that are used for the play of the multi-draw lottery game; and causing a display, by a display device remote from the processor, of an indication of the first award and the second award.

15. The method of claim 14, wherein the quantity of drawn symbols for each drawing of the draw lottery game is the same.

16. The method of claim 14, wherein the draw lottery game is one of a pick 3 draw lottery game and a pick 4 draw lottery game.

17. The method of claim 14, wherein the display device is part of a mobile device or part of the lottery terminal.

18. A method of operating a lottery gaming system comprising a lottery terminal comprising an optical scanner, a communications network, and a lottery server comprising a processor and a memory device that stores a plurality of instructions executable by the processor, the method comprising:

determining, via the processor, a single player multi-draw symbol for a play of a multi-draw lottery game comprising a pick 3 draw lottery game and an associated pick 4 draw lottery game, wherein the single player multi-draw symbol is one of a plurality of different symbols that are randomly selectable for a first drawing for the pick 3 draw lottery game and a second drawing for the pick 4 draw lottery game that are used for the multi-draw lottery game, wherein the single player multi-draw symbol is selected by a player via the lottery gaming system prior to the first drawing and prior to the second drawing, wherein the single player multi-draw symbol is determined by optically scanning, via the optical scanner of the lottery terminal, a playslip comprising a player multi-draw number selection portion, a wager indication portion, and a quick pick instruction portion, and wherein the playslip is either one of a paper playslip and a virtual playslip, and wherein the single player multi-draw symbol is the only symbol that the player picks via the playslip for the first drawing and for the second drawing;

generating, via the processor, a lottery ticket comprising the single player multi-draw symbol;

storing data associated with the lottery ticket;

causing the lottery ticket to be provided to a player via one or both of a paper copy and a virtual copy, the lottery ticket comprising a player multi-draw symbol portion comprising an indication of the single player multi-draw symbol for the play of the multi-draw lottery game;

for each of first drawing and the second drawing, independently and separately randomly determining, via a random number generator, a quantity of drawn symbols;

determining an award for the lottery ticket based on the single player multi-draw symbol and a total quantity of occurrences of the single player multi-draw symbol in all of the drawn symbols for the first drawing for the pick 3 draw lottery game and the second drawing for the pick 4 draw lottery game; and causing a display, by a display device remote from the processor, of an indication of the award amount.

19. The method of claim 18, which comprises receiving an indication of a wager for the play of the multi-draw lottery game.

20. The method of claim 18, wherein the display device is part of a mobile device or part of the lottery terminal.

21. A method of operating a lottery gaming system comprising a lottery terminal comprising an optical scanner and a display device, a communications network, and a lottery server comprising a processor and a memory device that stores a plurality of instructions executable by the processor, the method comprising:

determining, via the processor, a single player multi-draw symbol for a play of a multi-draw lottery game comprising a pick 3 draw lottery game and an associated pick 4 draw lottery game, wherein the single player multi-draw symbol is one of a plurality of different symbols that are randomly selectable for a first drawing for the first pick 3 draw lottery game and a second drawing for the pick 4 draw lottery game that are used for the multi-draw lottery game, wherein the single player multi-draw symbol is selected by a player via the lottery gaming system prior to the first drawing and prior to the second drawing, wherein the single player multi-draw symbol is determined by optically scanning, via the optical scanner of the lottery terminal, a playslip comprising a player multi-draw number selection portion, a wager indication portion, and a quick pick instruction portion, and wherein the playslip is a paper playslip, and wherein the single player multi-draw symbol is the only symbol that the player picks via the playslip for the first drawing and the second drawing;

generating, via the processor, a lottery ticket comprising the single player multi-draw symbol;

storing data associated with the lottery ticket;

causing the lottery ticket to be provided to a player via a paper copy, the lottery ticket comprising a player multi-draw symbol portion comprising an indication of the single player multi-draw symbol for the play of the multi-draw lottery game;

for each of the first drawing and the second drawing, independently and separately randomly determining, via a random number generator, a quantity of drawn symbols;

determining an award for the lottery ticket based on the single player multi-draw symbol and a total quantity of occurrences of the single player multi-draw symbol in all of the drawn symbols for the first drawing for the pick 3 draw lottery game and the second drawing for the pick 4 draw lottery game; and causing a display, by the display device remote from the processor, of an indication of the award amount.

22. The method of claim 21, which comprises receiving an indication of a wager for the play of the multi-draw lottery game.

* * * * *